United States Patent
Mahaffey et al.

(10) Patent No.: US 9,852,416 B2
(45) Date of Patent: Dec. 26, 2017

(54) SYSTEM AND METHOD FOR AUTHORIZING A PAYMENT TRANSACTION

(71) Applicant: LOOKOUT, INC., San Francisco, CA (US)

(72) Inventors: Kevin Patrick Mahaffey, San Francisco, CA (US); Brian James Buck, Livermore, CA (US)

(73) Assignee: LOOKOUT, INC., San Francisco, CA (US)

( * ) Notice: Subject to any disclaimer, the term of this patent is extended or adjusted under 35 U.S.C. 154(b) by 879 days.

(21) Appl. No.: 13/829,132

(22) Filed: Mar. 14, 2013

(65) Prior Publication Data

US 2014/0279111 A1 Sep. 18, 2014

(51) Int. Cl.
*G06Q 20/32* (2012.01)
*G06Q 20/40* (2012.01)
(Continued)

(52) U.S. Cl.
CPC ......... *G06Q 20/3224* (2013.01); *G06Q 20/20* (2013.01); *G06Q 20/202* (2013.01); *G06Q 20/322* (2013.01); *G06Q 20/3278* (2013.01); *G06Q 20/40* (2013.01); *H04L 67/02* (2013.01); *H04L 67/10* (2013.01); *H04L 67/1097* (2013.01); *H04L 67/16* (2013.01); *H04L 67/42* (2013.01)

(58) Field of Classification Search
CPC .... G06Q 20/202; G06Q 20/20; G06Q 20/322; G06Q 20/40; G06Q 20/3278
USPC .......................................................... 705/21
See application file for complete search history.

(56) References Cited

U.S. PATENT DOCUMENTS 5,715,518 A   2/1998   Barrere et al.
6,696,941 B2  2/2004   Baker
(Continued)

FOREIGN PATENT DOCUMENTS

WO   2010048218   4/2010
WO   2010048220   4/2010
WO   2012027588   1/2012

OTHER PUBLICATIONS

Exploring methodologies to investigate cross-border identity theft in the San Diego-Tijuana region: From point of use to perpetrator Clift, Daniel. Utica College, ProQuest Dissertations Publishing, 2013.*
(Continued)

*Primary Examiner* — Ryan Zeender
*Assistant Examiner* — Fawaad Haider
(74) *Attorney, Agent, or Firm* — Dergosits & Noah LLP

(57) ABSTRACT

A method for authorizing a mobile payment transaction is provided. The method includes receiving, by a server, a request to authorize a payment transaction which originates from a point of sale (POS) module. In an embodiment, the request includes payment information of the payment transaction and location information of the POS module. When the request is received, an authorizing client device for the payment transaction is identified based on the payment information and a disposition of the request to authorize the payment transaction is determined based on whether the authorizing client device is located within a predetermined proximity to the POS module.

17 Claims, 4 Drawing Sheets

(51) Int. Cl.
  *G06Q 20/20* (2012.01)
  *H04L 29/08* (2006.01)
  *H04L 29/06* (2006.01)

(56) References Cited

U.S. PATENT DOCUMENTS

| | | | |
|---|---|---|---|
| 6,892,225 | B1 | 5/2005 | Tu et al. |
| 7,159,237 | B2 | 1/2007 | Schneier et al. |
| 7,181,252 | B2 | 2/2007 | Komsi |
| 7,304,570 | B2 | 12/2007 | Thomas et al. |
| 7,783,281 | B1 | 8/2010 | Cook et al. |
| 7,809,366 | B2 | 10/2010 | Rao et al. |
| 7,991,854 | B2 | 8/2011 | Bahl |
| 8,087,082 | B2 | 12/2011 | Bloch et al. |
| 8,108,555 | B2 | 1/2012 | Awadallah et al. |
| 8,121,617 | B1 | 2/2012 | LaGrotta et al. |
| 8,135,395 | B2 | 3/2012 | Cassett et al. |
| 8,195,196 | B2 | 6/2012 | Haran et al. |
| 8,259,568 | B2 | 9/2012 | Laudermilch et al. |
| 8,261,351 | B1 | 9/2012 | Thornewell et al. |
| 8,266,288 | B2 | 9/2012 | Banerjee et al. |
| 8,266,324 | B2 | 9/2012 | Baratakke et al. |
| 8,346,860 | B2 | 1/2013 | Berg et al. |
| 8,356,080 | B2 | 1/2013 | Luna et al. |
| 8,364,785 | B2 | 1/2013 | Plamondon |
| 8,521,131 | B1 | 8/2013 | Ramalingam et al. |
| 2004/0209608 | A1 | 10/2004 | Kouznetsov et al. |
| 2005/0138450 | A1 | 6/2005 | Hsieh |
| 2005/0186954 | A1 | 8/2005 | Kenney |
| 2005/0221800 | A1 | 10/2005 | Jackson et al. |
| 2006/0085357 | A1 | 4/2006 | Pizarro |
| 2006/0217115 | A1 | 9/2006 | Cassett et al. |
| 2006/0236325 | A1 | 10/2006 | Rao et al. |
| 2007/0021112 | A1 | 1/2007 | Byrne et al. |
| 2007/0038677 | A1 | 2/2007 | Reasor et al. |
| 2007/0089165 | A1 | 4/2007 | Wei et al. |
| 2007/0090954 | A1 | 4/2007 | Mahaffey |
| 2007/0190995 | A1 | 8/2007 | Wang et al. |
| 2007/0240127 | A1 | 10/2007 | Roques et al. |
| 2008/0046369 | A1 | 2/2008 | Wood |
| 2008/0049653 | A1 | 2/2008 | Demirhan et al. |
| 2008/0307243 | A1 | 12/2008 | Lee |
| 2009/0172227 | A1 | 7/2009 | Taylor et al. |
| 2009/0205016 | A1 | 8/2009 | Milas |
| 2010/0019731 | A1 | 1/2010 | Connolly et al. |
| 2010/0097494 | A1 | 4/2010 | Gum et al. |
| 2010/0100591 | A1 | 4/2010 | Burgess et al. |
| 2010/0100939 | A1 | 4/2010 | Burgess et al. |
| 2010/0100959 | A1 | 4/2010 | Mahaffey |
| 2010/0100963 | A1 | 4/2010 | Mahaffey et al. |
| 2010/0100964 | A1 | 4/2010 | Burgess et al. |
| 2010/0210240 | A1 | 8/2010 | Mahaffey et al. |
| 2010/0240419 | A1 | 9/2010 | Horino |
| 2010/0320266 | A1* | 12/2010 | White .......................... 235/375 |
| 2011/0047033 | A1 | 2/2011 | Mahaffey et al. |
| 2011/0047594 | A1 | 2/2011 | Mahaffey et al. |
| 2011/0047597 | A1 | 2/2011 | Barton et al. |
| 2011/0047620 | A1 | 2/2011 | Mahaffey et al. |
| 2011/0075556 | A1* | 3/2011 | Li .......................... H04W 28/08 370/230 |
| 2011/0119765 | A1 | 5/2011 | Burgess et al. |
| 2011/0145920 | A1 | 6/2011 | Burgess et al. |
| 2011/0171923 | A1 | 7/2011 | Daly et al. |
| 2011/0241872 | A1 | 10/2011 | Mahaffey |
| 2011/0296510 | A1 | 12/2011 | Hatlelid et al. |
| 2012/0042382 | A1 | 2/2012 | Mahaffey |
| 2012/0060222 | A1 | 3/2012 | Burgess et al. |
| 2012/0072569 | A1 | 3/2012 | Xu |
| 2012/0084836 | A1 | 4/2012 | Mahaffey et al. |
| 2012/0084864 | A1 | 4/2012 | Burgess et al. |
| 2012/0096555 | A1 | 4/2012 | Mahaffey |
| 2012/0110174 | A1 | 5/2012 | Mahaffey et al. |
| 2012/0124239 | A1 | 5/2012 | Shribman et al. |
| 2012/0179801 | A1 | 7/2012 | Luna et al. |
| 2012/0179814 | A1 | 7/2012 | Swildens et al. |
| 2012/0188064 | A1 | 7/2012 | Mahaffey et al. |
| 2012/0196571 | A1 | 8/2012 | Grkov et al. |
| 2012/0233695 | A1 | 9/2012 | Mahaffey et al. |
| 2012/0259954 | A1 | 10/2012 | McCarthy et al. |
| 2012/0303735 | A1 | 11/2012 | Raciborski et al. |
| 2012/0317233 | A1 | 12/2012 | Redpath |
| 2012/0324076 | A1 | 12/2012 | Zerr et al. |
| 2012/0324094 | A1 | 12/2012 | Wyatt et al. |
| 2012/0324568 | A1 | 12/2012 | Wyatt et al. |
| 2013/0019311 | A1 | 1/2013 | Swildens et al. |
| 2013/0023209 | A1 | 1/2013 | Fisher et al. |
| 2013/0041974 | A1 | 2/2013 | Luna et al. |
| 2013/0047034 | A1 | 2/2013 | Salomon et al. |
| 2013/0086682 | A1 | 4/2013 | Mahaffey et al. |
| 2013/0268378 | A1* | 10/2013 | Yovin .......................... 705/18 |

OTHER PUBLICATIONS

PCT International Preliminary Report on Patentability for PCT/US2011/049182; dated Mar. 7, 2013; pp. 1-9.

Non-Final Office Action dated Dec. 26, 2012 for U.S. Appl. No. 13/160,382, filed Jun. 14, 2011; pp. 1-23.

Sprite Mobile, Sprite Backup, Internet Archive, Way Back Machine, available at http://web.archive.org/web/20080903231803/http://www.spritesoftware.com/?page_id=280, 4 pages, Retrieved Jan. 16, 2013.

Sprint Nextel, Mobile Locator, Internet Archive, Way Back Machine, available at http://web.archive.org/web/20080901070835/http://www.nextel.com/en/solutions/gps/mobile_locator.shtml, 2 pages, Retrieved Jan. 16, 2013.

* cited by examiner

SYSTEM AND METHOD FOR AUTHORIZING A PAYMENT TRANSACTION

TECHNICAL FIELD

The present invention relates to the field of information technology, including, more particularly, to systems and techniques for authorizing a payment transaction based on a location of an authenticating device.

BACKGROUND OF THE INVENTION

Mobile electronic communication devices have evolved beyond simple telephone functionality and are now highly complex multifunctional devices with capabilities rivaling those of desktop or laptop computers. In addition to voice communications, many mobile communication devices are capable of text messaging, e-mail communications, internet access, and the ability to run full-featured application software. Mobile communication devices can use these capabilities to perform online transactions such as banking, stock trading, payments, and other financial activities. Furthermore, mobile communication devices used by an individual, a business, or a government agency often store confidential or private information in forms such as electronic documents, text messages, access codes, passwords, account numbers, e-mail addresses, personal communications, phone numbers, and financial information.

In addition to the functionality described above, mobile electronic communication devices are frequently being used to perform mobile payments, thereby eliminating the need, in some cases, for customers to carry coin/paper currency, checks or credit/debit cards. In a particular implementation, a merchant or a service provider is equipped with a point of sale ("POS") module, e.g., an NFC reader, that is coupled to a payment processing system on a server or in a cloud computing environment. When a mobile communication device is configured for mobile payments, a user of the device can purchase items from the merchant by simply using the device to exchange a user's payment credentials from the device to the POS module. The credentials can be transmitted to the POS module by tapping the configured mobile communication device on a sensor of the POS module, or by waving the device near the POS module's sensor. The payment amount can be deducted from a pre-paid account or charged to a mobile or bank account directly.

As mobile payments using phone-based or electronic wallet-based payments mediated by the use of mobile devices become more widespread, it is more likely that there will be attempts to steal user payment credentials and to use them fraudulently. This could be done by malware on a user's communication device or personal computer, or by network eavesdropping on a user's network connections, for example. Accordingly, a merchant, a payment processor, and/or the user herself need to be sure that when mobile payment credentials are presented at a POS module, the person presenting them is actually the user associated with the payment credentials or is someone who has stolen the payment credentials to make unauthorized purchases.

DESCRIPTION OF THE FIGURES

In the following drawings like reference numbers are used to refer to like elements. Although the following figures depict various examples, the one or more implementations are not limited to the examples depicted in the figures.

DETAILED DESCRIPTION

Figure 1:
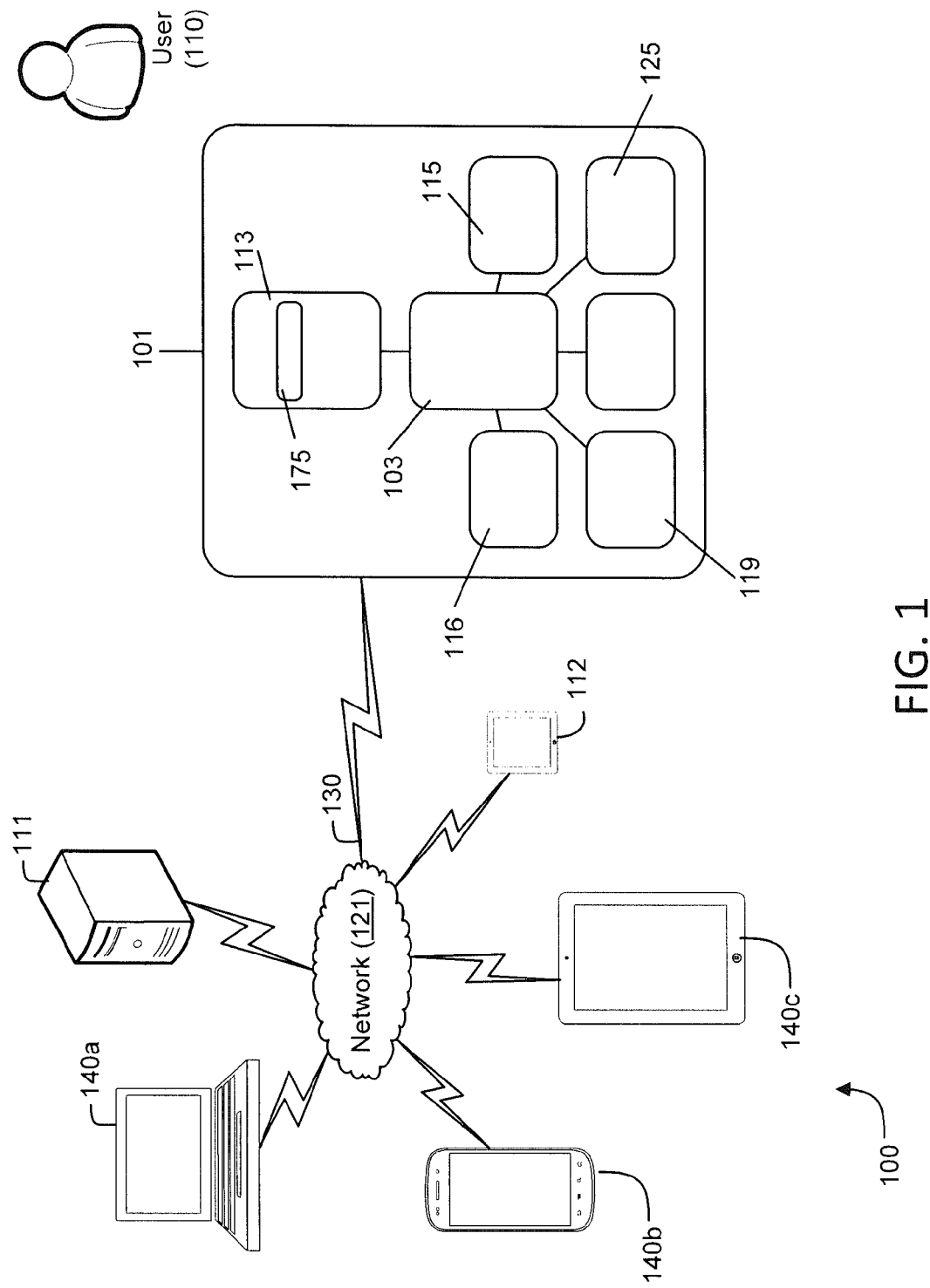
FIG. 1 is a block diagram illustrating a system including an electronic device and a server coupled to a network according to an embodiment.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications, software programs or computer readable instructions may be referred to as components or modules. Applications may take the form of software executing on a general purpose computer or be hardwired or hard coded in hardware. Applications may also be downloaded in whole or in part through the use of a software development kit, framework, or toolkit that enables the creation and implementation of the present invention. In this specification, these implementations, or any other form that the invention may take, may be referred to as techniques. In general, the order of the steps of disclosed processes may be altered within the scope of the invention.

According to an embodiment, an authorizing client device is associated with a user and is typically located on or near the user. Thus, the location of the authorizing client device is indicative of the user's location. Based on this assumption, when a mobile payment transaction of the user is initiated on a POS module, the location of the user's authorizing client device can be used to determine whether the payment transaction is legitimate, e.g., being initiated by the user, or fraudulent, e.g., being initiated by a person other than the user.

In an embodiment, a system for authorizing a mobile payment transaction includes an anti-fraud service coupled to the payment processing system that interfaces with the POS module. When a payment transaction is initiated at the POS module, the anti-fraud service can receive a request to authorize the payment transaction. The request can include payment information of the payment transaction and information identifying the POS module, which can include or be used to identify the POS's location. When the request is received, the anti-fraud service can identify an authorizing client device based on the payment information and then can determine location information of the authorizing client device. Once the location information of the authorizing client device and of the POS module are determined, the anti-fraud service can compare the location information to determine a disposition of the request to authorize the payment transaction.

According to an embodiment, when the location of the user's authorizing client device is at or near the POS module, the user associated with the presented payment information is presumably also at or near the POS module, and payment authorization can be granted. Otherwise, when the opposite is true, i.e., the authorizing client device's location is not in proximity to the POS module, the payment authorization can be denied or additional authentication information can be requested from the customer. In an embodiment, the authorizing client device can be a dedicated device. In another embodiment, the authorizing client device can be a personal electronic device associated with the user, e.g., a smart phone, a car fob, or any other personal item typically carried by the user.

As used herein, the term "mobile communication device" refers to mobile phones, tablets, PDAs and smartphones. The term "mobile communications device" also refers to a class of laptop computers which run an operating system that is also used on mobile phones, tablets, PDAs, or smartphones. Such laptop computers are often designed to operate with a continuous connection to a cellular network or to the internet via a wireless link. Specifically, mobile communication devices include devices for which wireless communication services such as voice, messaging, data, or other wireless Internet capabilities are a primary function. As used herein, a "mobile communication device" may also be referred to as an "electronic device," an "electronic client device," "mobile device," "mobile client," or "handset." However, a person having skill in the art will appreciate that while the present invention is disclosed herein as being used on mobile communication devices, the present invention may also be used on other computing platforms, including desktop, laptop, notebook, netbook, or server computers.

Prior to describing the subject matter in detail, an exemplary network in which the subject matter may be implemented shall first be described. Those of ordinary skill in the art will appreciate that the elements illustrated in FIG. 1 may vary depending on the system implementation. FIG. 1 is a simplified block diagram of a computer network 100 that includes a mobile communication device 101, a server system 111, a POS module 112 and other electronic client devices 140a-140c, coupled to a communication network 121 via a plurality of communication links 130. Communication network 121 may be comprised of many interconnected computer systems and communication links. Communication links 130 may be hardwire links, optical links, satellite or other wireless communications links, wave propagation links, or any other mechanisms for communication of information. Various communication protocols may be used to facilitate communication between the various devices shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 112 can be the Internet, in other embodiments, communication network 112 may be any suitable communication network including a local area network (LAN), a wide area network (WAN), a wireless network, a intranet, a private network, a public network, a switched network, and combinations of these, and the like.

In an embodiment, the mobile device 101 includes: an operating system 113, an input device 115, a radio frequency transceiver(s) 116, a visual display 125, and a battery or power supply 119. Each of these components is coupled to a central processing unit (CPU) 103. The device operating system 113 runs on the CPU 103 and enables interaction between application programs and the mobile device hardware components. In an embodiment, the mobile device 101 receives data through an RF transceiver(s) 116 which may be able to communicate via various networks, for example: BLUETOOTH, local area networks such as WI-FI, and cellular networks such as GSM, CDMA or LTE.

In an embodiment, a local software component 175 is an application program that is downloaded to a mobile device and installed so that it integrates with the operating system 113. Much of the source code for the local software component 175 can be reused between various mobile device platforms by using a cross-platform software architecture. In such a system, the majority of software functionality can be implemented in a cross-platform core module. The cross-platform core can be universal allowing it to interface with various mobile device operating systems by using a platform-specific module and a platform abstraction module that both interact with the mobile device operating system 113, which is described in U.S. Pat. No. 8,099,472, entitled "SYSTEM AND METHOD FOR A MOBILE CROSS-PLATFORM SOFTWARE SYSTEM." In another embodiment, the local software component 175 can be device, platform or operating system specific.

As indicated above, the mobile device 101 may operate in a networked environment using logical connections 130 to one or more remote nodes 111, 112, 140a-140c via a communication interface. The remote node may be another computer 140a, a server 111, an NFC reader/POS module 112, a client device 140b-140c or other common network node, and typically includes many or all of the elements described above relative to the mobile device 101. The communication interface may interface with a wireless network and/or a wired network. Examples of wireless networks include, for example, a BLUETOOTH network, a wireless personal area network, a wireless 802.11 local area network (LAN), a near field communication (NFC), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like.

It should be understood that the arrangement of mobile communication device 101 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of mobile device 101. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware.

Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the device, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

Figure 2:
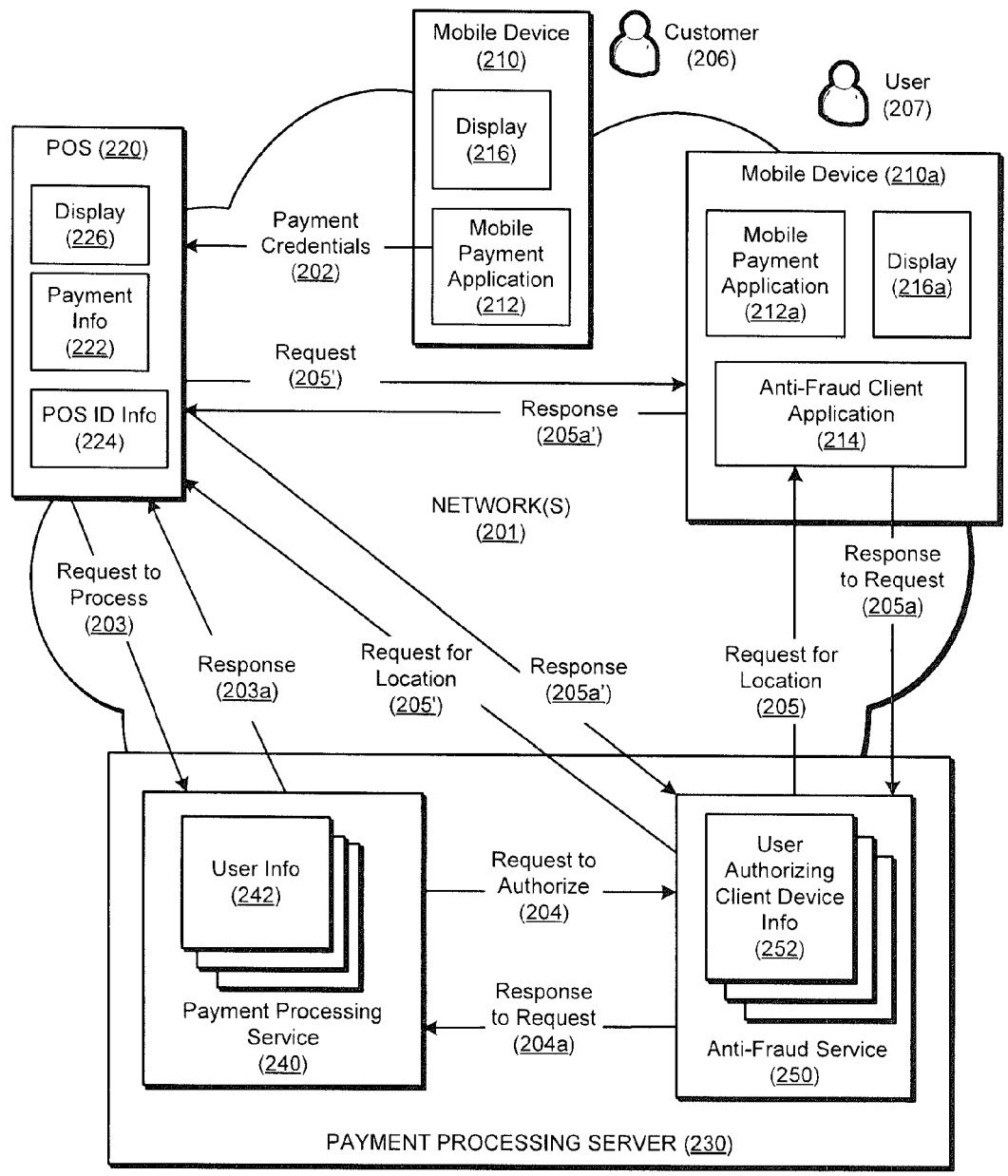
FIG. 2 is a block diagram illustrating of a specific implementation of a system of the invention according to an embodiment.

FIG. 2 is a block diagram illustrating a system for authorizing a mobile payment transaction according to an embodiment. As is shown in FIG. 2, the system 200 includes a payment facilitating device 210, a POS module 220, and a payment processing server 230 communicatively coupled to one another over one or more communication networks 201. The payment facilitating device 210 can be the client device used to initiate a payment transaction via the POS module 220 and can be a mobile communication device 101, or any one of the other electronic client systems 140a-140c. Accordingly, the payment facilitating device 210 can include a display screen 216 and an operating system (not shown) that supports various device features and/or applications, such as a mobile payment application 212. The device 210 can be a portable electronic device that can be easily carried in a customer's pocket, wallet, purse or other personal item. In an embodiment, the device 210 can be a dedicated stand-alone device such as a card or a key chain. Alternatively, it can be integrated with another portable electronic client device associated with the customer 206, e.g., the customer's smart phone, car fob, or any other personal item typically carried by the customer.

The POS module 220 can be an in-store NFC reader and/or a BLUETOOTH enabled device that is configured to receive the user's payment credentials 202 for the payment transaction from the payment facilitating device 210. In an embodiment, for example, when the payment facilitating device 210 is positioned near a sensor (not shown) in the POS module 220 or is physically tapped against the sensor, the customer's payment credentials 202 can be transmitted to the POS module 220. According to an embodiment, the POS module 220 collects payment information 222 for the payment transaction that can include the customer's payment credentials 202 and information identifying the customer 206. The payment information 222 can then be transmitted from the POS module 220 to the payment processing server 230 in a request to process the payment 203.

The payment processing server 230 hosts a payment processing service 240 that stores user information 242 that can include information identifying the user 207, a user's credit/debit card information and/or banking information so that mobile payment transactions can be processed for the user's purchases. The payment processing service 240 can receive the request to process the payment transaction 203 and can use the included payment credentials 202 of the customer 206/user 207 to retrieve the user information 242 associated with the user 207. The amount of the payment transaction can then be deducted from or charged to the user's banking/credit account. When the payment transaction is completed, the payment processing service 240 can generate a response 203a to the request to process that indicates that the payment transaction was successfully processed and can transmit the response 203a to the POS module 220. When the response 203a is received, the POS module 220 can provide a receipt to the customer 206 or provide some other indication that the payment transaction has been successfully completed, e.g., by providing a message on a display 226.

Presumably, the customer 206 and the user 207 are the same entity and presumably, the submitted payment credentials 202 are associated with the customer 206/user 207. Nonetheless, such an assumption may be erroneous if the payment credentials 202 have been stolen by the customer 206 and embedded into the mobile payment application 212 of the facilitating device 210. In this case, the customer 206 can effectively impersonate the user 207 and use the user's payment credentials 202 to improperly procure items and/or services, which will be charged to the user 207.

To address this issue, a system and method is described for authorizing a mobile payment transaction based on the proximity of an authorizing client device associated with the user 207 to the POS module 220. According to an embodiment, the authorizing client device can be a device that is typically on or near the user 207 so that a location of the authorizing client device is indicative of a location of the user 207. Thus, when the authorizing client device's location is at or near a location of the POS module 220, it is highly likely that the customer 206 and the user 207 are the same entity and that the payment transaction is legitimate. When the opposite is true, there is a strong suggestion that the payment transaction is fraudulent.

Figure 3:
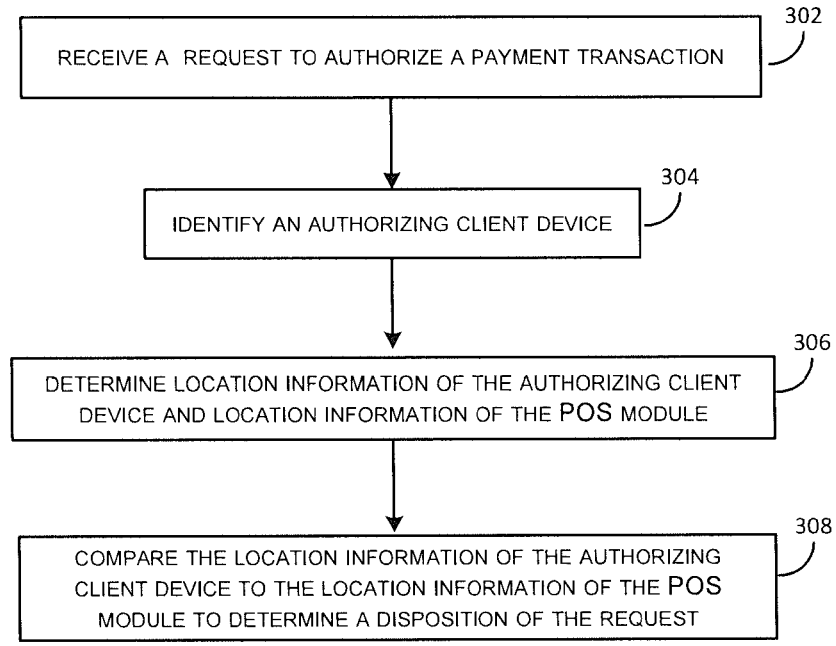
FIG. 3 is an operational flow diagram illustrating a high level overview of a method of the invention according to an embodiment.

FIG. 3 is a flow diagram illustrating a method for authorizing a mobile payment transaction according to an embodiment. The method illustrated in FIG. 3 can be carried out by at least some of the components in the example electronic device(s) illustrated in FIG. 1 and FIG. 2, but can also be carried out in environments other than those illustrated in FIG. 1 and FIG. 2. According to an embodiment, the method 300 begins, in block 302, when a request to authorize a payment transaction that originates from a POS module is received. In an embodiment, a system for authorizing a mobile payment transaction includes an anti-fraud service 250 configured for receiving the request to authorize the payment transaction 204. According to an embodiment, the anti-fraud service 250 can receive the request 204 from the payment processing service 240 when it receives the request to process the payment transaction 203 from the POS module 220.

Figure 4:
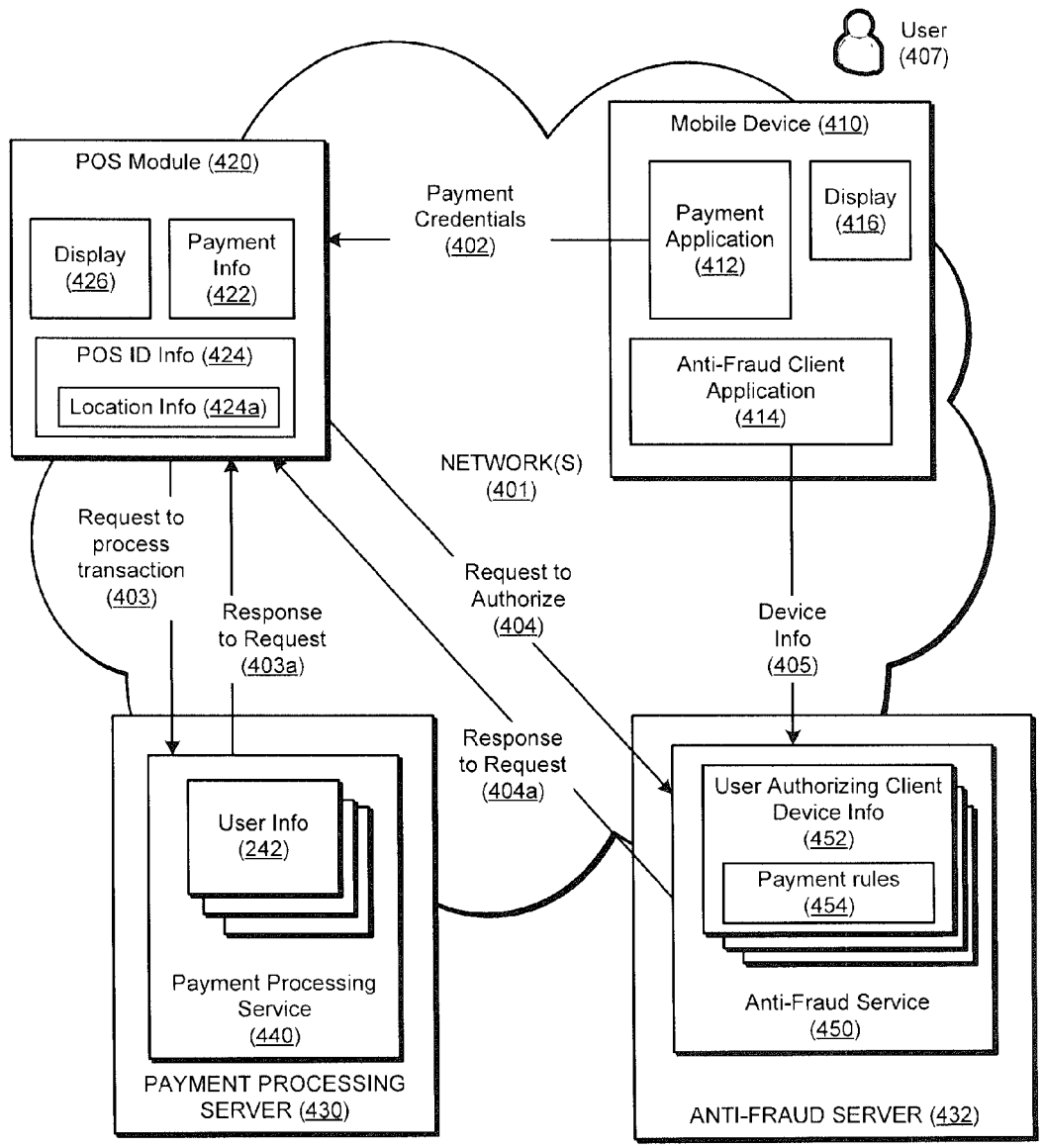
FIG. 4 is a block diagram illustrating an alternative implementation of a system of the invention according to an embodiment.

The anti-fraud service 250 can be hosted by the payment processing server 230 as is shown in FIG. 2. Alternatively, in another embodiment shown in FIG. 4, the anti-fraud service 450 can reside in another server 432 communicatively coupled to the payment processing server 430 and/or to the POS module 420 over the network 401. In this embodiment, the anti-fraud service 450 can receive the request 404 over the network 401 from the POS module 420 when the POS module 420 receives the payment credentials 402 from the facilitating mobile device 410. In another embodiment, the payment processing service 240, 440 and/or the anti-fraud service 250, 450 can be integrated in a common device with the POS module 220, 420. In this case, the anti-fraud service 250, 450 can receive the request to authorize 204, 404 via an internal link from either the payment processing service 240, 440 or the POS module 220, 420.

In an embodiment, the request to authorize the payment transaction 204, 404 can include the payment information 222, 422 of the payment transaction and information identifying the POS module 224, 424. As stated above, the payment information 222 can include the payment credentials, e.g., 202, and information identifying the user 207 with which the payment credentials are associated. The information identifying the POS, e.g., 424, can include location information of the POS module 424a and/or information that can be used to determine the location information of the POS module 220, 420. For example, the POS identifying information, e.g., 224, can include an identifier that can be correlated to a location of the POS module 220. This correlation can be included in a table that associates POS identifiers with locations for a plurality of POS modules, and the table can be stored in a database (not shown) on the payment processing server 230 or elsewhere on another server accessible via the network 201.

Referring again to FIG. 3, when the request to authorize the payment transaction 204, 404 is received by the anti-fraud service component (250, 450), an authorizing client device for the payment transaction is identified based on the payment information 222, 422 in block 304. According to an embodiment, the authorizing client device, e.g., 210a, is a personal mobile device associated with a user 207 that includes a mobile payment application 212a, and an anti-fraud client application 214 which allows the anti-fraud service 250 to communicate with the authorizing client device 210a over the network 201. In an embodiment, for example, the authorizing client device 210a can be a smartphone, a tablet computer, or any network enabled handheld personal device.

In an embodiment, during a service registration phase, a user 207 can designate one or more of her personal network enabled client devices to be an authorizing client device 210a for the user's mobile payment transactions. The user 207 can provide information relating to the client device 210a that enables the anti-fraud service 250 to communicate with the client device 210a. For example, when the authorizing client device 210a is the user's mobile phone, the phone number associated with the phone can be provided. In another embodiment, the authorizing client device 210a can be a dedicated client device that is provided to the user 207 upon registering with a service provider associated with the anti-fraud service.

According to an embodiment, the anti-fraud service component 250, 450 can store the information relating to the user's authorizing client device(s) 252, 452 in a storage component coupled to the server 230, 432 and accessed by the anti-fraud service component 250, 450. In an embodiment, when the request to authorize the payment transaction 204, 404 is received, the anti-fraud service 250, 450 can be configured to extract the payment credentials 202, 402 of the user 207 from the payment information 222, 422, in order to identify the user 207. Once the user 207 is identified, the anti-fraud service 250, 450 can be configured, in an embodiment, to identify the user's authorizing client device 210a by retrieving the information 252, 452 relating to the user's authorizing client device(s).

Referring again to FIG. 3, once the authorizing client device for the payment transaction, e.g., 210a, is identified, the anti-fraud service 250 is configured to determine location information of the authorizing client device 210a in block 306. As noted above, the information 252 relating to the user's authorizing client device 210a includes information that enables the anti-fraud service 250 to communicate with the client device 210a. Therefore, according to an embodiment, the anti-fraud service, e.g., 250, can use the information 252 to generate and transmit a request for location information 205 to the authorizing client device 210a over the network 201, which in an embodiment, can be a Wi-Fi network, a LAN, a PAN, a WAN, a BLUETOOTH network, or a near field communication (NFC) depending on the circumstances. In another embodiment when the authorizing client device 210a is a phone connected to a cellular network, the request message 205 can be transmitted over the cellular network 201.

In another embodiment, the anti-fraud service 250 can transmit the request for location information 205' to the authorizing client device 210a indirectly via the POS module 220. In this case, when the POS module 220 receives the request 205', it can be configured to forward the request 205' to the authorizing client device 210a over the network 201, which in this embodiment, can be a wireless short range personal area network ("WPAN"), such as a BLUETOOTH network or a NFC network.

When the request for location 205 is received by the authorizing client device 210a, the anti-fraud client application 214 in the client device 210a can provide its location information in several ways. For example, in an embodiment, when the client device 210a is equipped with a Global Positioning System ("GPS") tracking unit, the device's location information can be provided as geo-coordinates associated with its location. Alternatively or in addition, when the client device 210a is connected to a cellular network that includes a plurality of cell towers, the device's location information can also be provided as the location of a cell tower nearest to the authorizing client device 210a. For example, the nearest cell tower can be the destination tower that transmits the request message 205 directly to the authorizing client device 210a. Alternatively or in addition, when the client device 210a is connected to a wired or wireless network 201, the location information can be related to a wireless access point of the wireless network or related to a LAN.

According to an embodiment, the anti-fraud client application 214 in the client device 210a can be configured to generate a response 205a to the request for location 205 and to include the device's location information in the response 205a. The response 205a can then be returned to and received by the anti-fraud service 250 over the network 201. In an embodiment, the anti-fraud service 250 can receive the response 205a directly from the client device 210a over the network 201, while in another embodiment, the anti-fraud service 250 can receive the response 250a' indirectly via the POS module 220. In the latter case, the response 205a' may not be received by the POS module 220 when the authorizing client device 210a is not located within the module's short range WPAN 201. If, however, the client device 210a is located within the short range WPAN 201, the POS module 220 can be configured to receive and forward the response 205' to the anti-fraud service 250 over the network 201.

As discussed above, the anti-fraud service 250 can be configured to transmit the request for location 205, 205' to the authorizing client device 210a over different network environments, e.g., a WAN and a WPAN. The response 205a, 250a' from the authorizing client device 210a can be received over the same network environment as the one used to transmit the request or over a different network environment from that used to transmit the request. Accordingly, in an embodiment, the anti-fraud service 250 can transmit the request 205 to the client device 210a directly over a WAN, such as the Internet, and the response 205a' can be received indirectly via the POS module 220 over a BLUETOOTH network and a WAN.

Referring again to FIG. 3, when the location information of the authorizing client device is determined, the anti-fraud service 250, 450 can be configured to compare the location information of the authorizing client device 210a, 410 to the location information of the POS module 220, 420 to determine a disposition of the request to authorize the payment transaction in block 308. According to an embodiment, the disposition of the request, i.e., whether the request 204, 404 is granted, denied, or pending, can be determined based on whether and to what degree the location of the authorizing client device 210a, 410 is different from the location of the POS module 220, 420.

For example, in FIG. 2, because the authorizing client device 210a is not the payment facilitating client device 210, there is a likelihood that the authorizing client device 210a will be in a different location from the POS module 220, and that therefore the location information of the client device 210a will be different from that of the POS module 220. Alternatively, in FIG. 4, because the authorizing client device 410 is the payment facilitating device, it is likely that the location information of the authorizing client device 410 is substantially the same as the location information of the POS module 420.

Depending on the circumstances, when the location information of the authorizing client device 210a, 410 is different from the location information of the POS module 220, 420, the anti-fraud service 250, 450 can be configured to deny the request to authorize the payment transaction in an embodiment. In another embodiment, when the location information of the authorizing client device corresponds to a first geo-location and the location information of the POS module corresponds to a second geo-location, the anti-fraud service 250, 450 can be configured to deny the request to authorize the payment transaction when a distance between the first geo-location and the second geo-location exceeds a threshold distance. According to an embodiment, the threshold distance can be provided by the user 207, 407 and/or by an administrator, and can vary according to contextual circumstances. For example, a threshold distance for a POS module 220 located in a highly restricted area can be shorter/smaller than the threshold distance for a POS module 420 in a public store because the adverse consequences of allowing an unauthorized transaction in the highly restricted area can be more severe than those in the public store.

According to an embodiment, the disposition of the request to authorize 204, 404 can also depend on other circumstances unrelated to proximity. In an embodiment, a plurality of payment rules 454 can be provided that define under what circumstances the request to authorize 404 should be granted or denied based on factors in addition to the authorizing client device's proximity to the POS module 420. For example, a payment rule 454 can be based on the location of the POS module 420 and can define whether the request to authorize 404 should be granted, denied, or conditionally granted when the POS module's location is within a specified region or location. So, for instance, such a location-based payment rule 454 can indicate that a request to authorize 404 should be denied when the POS module 420 is located in a specified location associated with a particular fast food restaurant. Thus, even though the authorizing client device's location is within a specified distance of the POS module's location, the request to authorize 404 will be denied when the POS module's location is in the fast food restaurant.

In another embodiment, a payment rule 454 can be based on a temporal attribute of the payment transaction that defines the disposition of the request to authorize 404 according to when the request to authorize 404 is received. For example, such a time-based payment rule 454 can indicate that a request to authorize 404 should be granted during specified hours, specified days of the week, specified months, or during a specified time interval. In an embodiment, because the payment rules 454 are based on different factors, they can be enforced independently and simultaneously. Thus, the time-based payment rule 454 can be enforced along with the location-based payment rule 454.

In another embodiment, a payment rule 454 can be based on a type of item and/or service associated with the payment transaction. For example, this type of payment rule 454 can provide a white or black list of items and services that are allowed or disallowed or disallowed unless additional authentication information is provided respectively. Similar to the other payment rules 454 described above, the item/service-based payment rules 454 can be enforced independently and simultaneously.

In addition, payment rules 454 can be based on a payment amount associated with the payment transaction. According to an embodiment, transaction amount-based payment rules 454 can define the disposition of the request to authorize 404 according to the cost of any individually charge item and/or the total cost associated with the payment transaction. For example, the cost-based payment rules 454 can indicate that a request to authorize 404 should be denied outright or conditionally denied unless additional authentication is provided when a cost of an individual item exceeds a threshold value, and/or when the total cost of the transaction exceeds another threshold value. In another embodiment, the request to authorize 404 can be denied or conditionally denied when a frequency of payment transactions within a specified time period exceeds another threshold value.

According to an embodiment, the payment rules 454 for the authorizing client device 410 can be defined and provided by the user 407 associated with the client device 410. In an embodiment, some payment rules 454 can be provided and stored during the registration phase along with the information relating to the authorizing client device 410. Alternatively or in addition, other payment rules 454 can be stored on the authorizing client device 410 and provided to the anti-fraud service component 450 when the payment transaction is initiated or pending. Accordingly, the anti-fraud service component 450 can be configured to determine the disposition of the request to authorize the payment transaction 404 based on whether the authorizing client device 410 is located within a predetermined proximity to the POS module 420 and on whether at least one of the payment rules 454 is satisfied.

As noted above, instead of or in addition to, denying the request, the anti-fraud service 250, 450 can be configured to conditionally deny the request unless additional authentication information is provided by the customer 206/user 407. For example, in an embodiment, when the anti-fraud service 250, 450 would otherwise deny the request, it can be configured instead to transmit an indication to the POS module 220, 420 directing it to request additional authentication information from the customer 206/user 407. For example, the customer 206 can be requested to produce additional forms of identification or to submit a PIN or password to prove that she is the user 207, 407 associated with the payment credentials 202.

In addition to denying the request and/or requesting additional authentication information, in another embodiment, the anti-fraud service 250, 450 can be configured to send a message relating to the requested payment transaction at the POS module 220 to the authorizing client device 210*a* for display to the user 207 on the device's display 216*a*. According to an embodiment, the message can include a request to verify the requested payment transaction thereby allowing the user 207 to override the anti-fraud service's denial and to indicate that the payment transaction is legitimate. For example, when the customer 206 is an employee of the user 207 and is making a purchase on behalf of the user 207, the user 207 can verify that the mobile payment transaction as an approved transaction. When the user 207 authorizes the requested payment transaction, the authorization can be included in a response to the request to verify, which can be transmitted to and received by the anti-fraud service 250. Upon receipt, the anti-fraud service 250 can be configured to disregard the denial and to grant the request to authorize the payment transaction.

Figure 5:
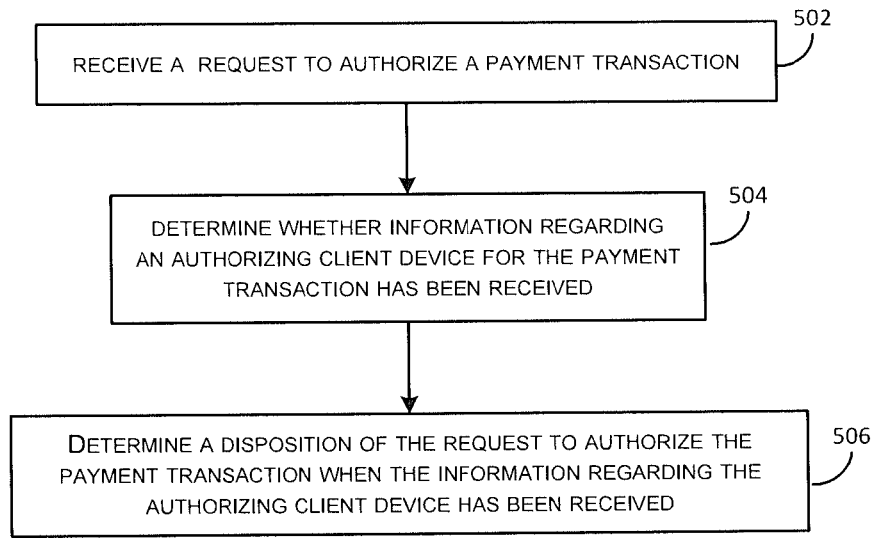
FIG. 5 is an operational flow diagram illustrating a high level overview of a method of the invention according to another embodiment.

In the embodiment described above, the anti-fraud service component 250 is configured to proactively determine the location information of the authorizing client device 210*a* so that the location information of the authorizing client device can be compared to that of the POS module 220. In another embodiment, the authorizing client device 410 can take a more proactive role in providing its information automatically, and the anti-fraud service component 450 can take a more passive role by listening for the information regarding the authorizing client device 410. FIG. 5 is a flow diagram illustrating a method for authorizing a mobile payment transaction according to this embodiment. The method illustrated in FIG. 5 can be carried out by at least some of the components in the example electronic device(s) illustrated in FIG. 1 and FIG. 4, but can also be carried out in environments other than those illustrated in FIG. 1 and FIG. 4.

According to an embodiment, the method 500 begins, in block 502, when the anti-fraud service component 450 receives the request to authorize a payment transaction 404 that originates from the POS module 420. As described above, the request to authorize 404 can be received from the POS module 420 when the POS module 420 receives the payment credentials 402 from the mobile device 410. Alternatively, it can be received from the payment processing service 440 when it receives the request to process the payment transaction 403 from the POS module 420. In either of these embodiments, the request 404 can be received over at least one external network 401. In another embodiment, when the payment processing service 440 and/or the anti-fraud service 450 are integrated in a common device with the POS module 420, the anti-fraud service 450 can receive the request to authorize 404 via an internal link from either the payment processing service 440 or the POS module 420.

Once the request to authorize the payment transaction 404 is received, the anti-fraud service 450 can be configured to determine whether information regarding an authorizing client device for the payment transaction has been received in block 504 and to determine a disposition of the request when the information has been received in block 506.

According to an embodiment, the anti-fraud client application 414 in the authorizing client device 410 can be configured to collect information regarding itself and to transmit that information 405 to the anti-fraud service component 450 periodically and/or spontaneously. For example, the anti-fraud client application 414 can be configured to transmit the information regarding itself 405 every five (5) minutes. In another embodiment, the anti-fraud client application 414 can be configured to transmit the information 405 when the payment application 412 is invoked and/or when the payment credentials 402 of the user 407 are presented to the POS module 420. Accordingly, the anti-fraud service component 450 can receive the information regarding the authorizing client device 405 periodically or when the client device 410 is used to facilitate a payment transaction.

In an embodiment, the information regarding the authorizing client device 405 can include information identifying the client device and its location information. The anti-fraud service component 450 can be configured to receive the information, to identify the authorizing client device 410 based on the received information, and to store the received information in the storage component along with the information relating to the user's authorizing client device(s) 452.

According to an embodiment, when the request to authorize 404 is received, the anti-fraud service component 450 can identify the authorizing client device 410 for the payment transaction and can determine that information regarding the identified authorizing client device 405 has been received. In an embodiment, the anti-fraud service component 450 can be configured to compare the location information of the authorizing client device 410 to the location information of the POS module 424*a*. In an embodiment where the information 405 is received periodically, the client device's location information received immediately prior to receiving the request to authorize 404 can be compared to the POS module's location information 424*a*. The anti-fraud service component 450 can be configured to grant the request to authorize the payment transaction when the comparison indicates that the authorizing client device 410 is located within a predetermined distance of the POS module 420.

In another embodiment where the client device 410 automatically transmits the information 405 when the payment transaction is initiated or while the payment transaction is pending, the fact that the information regarding the authorizing client device 405 is not received by the anti-fraud service component 450 suggests that the payment transaction is fraudulent. Thus, when the information regarding the authorizing client device 405 has not been received under these circumstances, the anti-fraud service component 450 can be configured to deny the request to authorize the payment transaction.

In another embodiment, as described above with regard to FIG. 2, the anti-fraud service component 250 can be configured to transmit a request 205, 205' for the client device information, e.g., the location information of the authorizing client device, to the client device 210*a* directly over the network 201 or indirectly via the POS module 220. When the request 205 is received directly over the network 201, the anti-fraud client application 214 cannot transmit its response 205*a'* to the anti-fraud service component 250 via the POS module 220 unless the client device 210*a* located within the module's wireless short range network. Alternatively, the anti-fraud service component 250 cannot transmit the request 205' to the anti-fraud client application 214 indirectly via the POS module 220 unless the client device 210*a* is located within the module's wireless short range network.

Accordingly, in this embodiment, the anti-fraud service component 250 will receive the information 405 regarding the authorizing client device when the client device 210a, 410 is located within the POS module's wireless short range network. In this case, when the information 405 regarding the authorizing client device has been received, the anti-fraud service component 450 can be configured to grant the request to authorize the payment transaction 404. Alternatively, when the client device 210a, 410 is not located within the POS module's wireless short range network, the information 405 will not be received. In this case, when the information 405 regarding the authorizing client device has not been received, the anti-fraud service component 450 can be configured to deny the request to authorize the payment transaction 404.

According to yet another embodiment, instead of transmitting a request for location information 205 to the authorizing client device 210a or waiting to receive information 405 regarding the authorizing client device 410, the anti-fraud service component 250, 450 can be configured to transmit the location information of the POS module 424a to the authorizing client device 410, and to request that the authorizing client device 410 confirm or deny that a current location of the authorizing client device substantially matches the POS module's location information 424a. In this embodiment, the anti-fraud client application 414 in the client device 410 can be configured to receive the location information of the POS module 424a and the request, and to compare its own location information to that of the POS module 420.

Based on the comparison, the anti-fraud client application 414 can generate a decision either confirming or denying that its current location information substantially matches the POS module's location information 424a. The anti-fraud client application 414 can then include the decision in a reply message and can transmit the reply message to the anti-fraud service component 450. Upon receiving the reply, the anti-fraud service component 450 can be configured to determine the disposition of the request to authorize the payment transaction 404 based on the authorizing client device's decision confirming or denying that the current location information of the authorizing client device substantially matches the POS module's location information 424a. For example, when the decision is confirming, the anti-fraud service component 450 can be configured to grant the request to authorize the payment transaction 404.

In an embodiment, the anti-fraud service 250, 450 can be configured to generate a response 204a, 404a to the request to authorize 204, 404 that includes the disposition of the request and to transmit the response to 204a, 404a to the payment processing service 240, 340 and/or the POS module 220, 420. In an embodiment when the response 204a is transmitted to the payment processing service 240, depending on the disposition of the request, the payment processing service 240 can either proceed with or stop processing the payment transaction. In another embodiment, when the response 404a is transmitted to the POS module 420, the POS module 420 can transmit the request 203 to process the payment transaction or deny the transaction depending on the disposition.

According to embodiments, a system for authorizing a mobile payment transaction that originates from a POS module includes an anti-fraud service component coupled to the POS module and/or to a payment processing service associated with the POS module. In an embodiment, when payment credentials associated with a user are provided to the POS module to initiate the payment transaction, the anti-fraud service component can identify and determine a location a client device typically carried by the user. Because the user typically carries the client device on his or her person, the device's location is indicative of the user's location. In an embodiment, when the anti-fraud service component determines that the user's client device is located at or near the POS module, the payment transaction can be authorized based on the assumption that the authorized user is carrying the client device and is also located at or near the POS module. When the location of the client device is not at or near the POS module, the authorized user is presumptively not at or near the POS module. In this case, the payment transaction can be denied outright or denied pending the presentation of additional authentication information from the customer.

According to an embodiment, the user may designate more than one of her personal network enabled client devices to be an authorizing client device 210a for the user's mobile payment transactions. The personal network enabled client devices can be in different locations, but typically only those devices that are actively in use will be considered in the same location as the user. That is, it would be unusual for one of the personal network enabled client devices to be actively in use at one location while one or more of the user's other personal network enabled client devices are actively in use at a different location.

In an embodiment, based on this premise, the anti-fraud service component may obtain current locations for a plurality of authorizing client devices, together with information indicating whether the devices are actively in use. If one of the authorizing client devices is at the location of the POS module, and the other authorizing client devices are not, but they are not currently active, then the transaction can be permitted. Alternatively, if one or more of the authorizing client devices are not at the location of the POS module and are actively in use, even if one of them is at the location of the POS module, the legitimacy of the transaction can be questionable. In this embodiment, under such a situation, the anti-fraud service component can deny the request to authorize the transaction, and/or request additional authentication or authorization information from the user via one or more of the authorizing client devices.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

In addition, one will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for processing a payment transaction, the method comprising:
   receiving, by a server, a request to proceed with the processing of a payment transaction, the request originating from a point of sale (POS) device, the request including: (i) information identifying the POS device and (ii) payment information for the payment transaction, the payment information including an identification of a user and the payment information being presented to the POS device by a payment facilitating device;
   identifying, by the server, a network-enabled authorizing client device for the payment transaction based on the received payment information, the authorizing client device being associated with the user in a prior registration phase and being different from the payment facilitating device;
   receiving, by the server, location information of the authorizing client device, the location information of the authorizing client device having been determined by the authorizing client device and including at least one of GPS geo-coordinates, information relating to a transmitting cell tower, information relating to a wireless access point, and information relating to a LAN;
   determining, by the server, location information of the POS device based on the received request information identifying the POS device;
   comparing, by the server, the received location information of the authorizing client device to the received location information of the POS device to determine a distance between the authorizing client device and the POS device; and
   when a transaction amount for the payment transaction exceeds a threshold transaction amount:
   (i) sending, by the server, a message to the authorizing client device for display to the user, the message including a request to verify the payment transaction; and
   (ii) granting, by the server, the request to proceed with the processing of the payment transaction when:
      (a) the distance between the authorizing client device and the POS device does not exceed a threshold distance and
      (b) a verifying response to the request to verify the payment transaction is received by the server from the authorizing client device.

2. The method of claim 1 wherein the information identifying the POS device includes the POS device's location information.

3. The method of claim 1 wherein the authorizing client device is a personal mobile device associated with the user.

4. The method of claim 3 wherein the personal mobile device is one of a smartphone, a tablet computer, and a handheld network enabled electronic device.

5. The method of claim 1 further including transmitting, by the server, a request to the authorizing client device over a network for the location information of the authorizing client device.

6. The method of claim 5 wherein the network is one of a BLUETOOTH network, a personal area network, a near field communication network, a LAN, and a WAN.

7. The method of claim 1 wherein when the authorizing client device is a mobile handheld device connected to a cellular network comprising a plurality of cell towers, and the location information of the authorizing client device is determined by the authorizing client device: identifying a destination cell tower in proximity to the authorizing client device, and transmitting a location of the destination cell tower.

8. The method of claim 1 wherein the received location information of the authorizing client device corresponds to a first geo-location and the received location information of the POS device corresponds to a second geo-location.

9. The method of claim 1 wherein when a transaction amount for the payment transaction exceeds a threshold transaction amount, the method further comprises:
   transmitting, by the server, an indication to the POS module directing the POS module to request additional authentication information.

10. The method of claim 1 further comprising:
    providing, to the server, a plurality of payment rules;
    determining, by the server, whether at least one of the plurality of payment rules is satisfied; and
    the granting the request to proceed with the processing of the payment transaction step further requires: at least one of the plurality of payment rules is satisfied.

11. The method of claim 10 wherein the plurality of payment rules is provided by a user associated with the authorizing client device.

12. The method of claim 10 wherein the plurality of payment rules is based on at least one of: a location of the POS device, a temporal attribute of the payment transaction, an item and/or service type associated with the payment transaction, and a payment amount associated with at least a portion of the payment transaction.

13. The method of claim 1 wherein the request to proceed with the processing of the payment transaction is received by an anti-fraud service in the server via an internal link or via a network.

14. A system for processing a payment transaction, the system comprising:
    a server coupled to at least one of a point of sale (POS) device, a payment processing module, and at least one-network-enabled client device;
    a storage component coupled to the server, the storage component storing information relating to a user and to a network-enabled authorizing client device associated with the user; and
    an anti-fraud service component hosted by the server and configured to:
       receive a request to proceed with the processing of a payment transaction, the request originating from a point of sale (POS) device, the request including: (i) information identifying the POS device and (ii) payment information for the payment transaction, the payment information including an identification of a user and the payment information being presented to the POS device by a payment facilitating device;
       identify a network-enabled authorizing client device for the payment transaction based on the received payment information, the authorizing client device being associated with the user in a prior registration phase and being different from the payment facilitating device;
       receive location information of the authorizing client device, the location information of the authorizing client device having been determined by the authorizing client device and including at least one of GPS geo-coordinates, information relating to a transmitting cell tower, information relating to a wireless access point, and information relating to a LAN;

determine location information of the POS device based on the received request information identifying the POS device;

compare the received location information of the authorizing client device to the received location information of the POS device to determine a distance between the authorizing client device and the POS device; and when a transaction amount for the payment transaction exceeds a threshold transaction amount:
  (i) send a message to the authorizing client device for display to the user, the message including a request to verify the payment transaction; and
  (ii) grant the request to proceed with the processing of the payment transaction when:
    (a) the distance between the authorizing client device and the POS device does not exceed a threshold distance and
    (b) a verifying response to the request to verify the payment transaction is received by the server from the authorizing client device.

15. The system of claim 14 wherein the request to proceed with the processing of the payment transaction is received from the POS device or the payment processing module.

16. The system of claim 14 wherein the storage component stores a plurality of payment rules provided by the user and wherein the anti-fraud service component is configured to determine whether at least one of the plurality of payment rules is satisfied and configured to grant the request to proceed with the processing of the payment transaction when: (i) the distance between the authorizing client device and the POS device does not exceed a threshold distance, (ii) a verifying response to the request to verify the payment transaction is received by the server from the authorizing client device, and (iii) at least one of the plurality of payment rules is satisfied.

17. A method for processing a payment transaction, the method comprising:

receiving, by a server, a request to proceed with the processing of a payment transaction, the request originating from a point of sale (POS) device, the request including: (i) payment information of the payment transaction, the payment information including an identification of a user and the payment information being presented to the POS device by a payment facilitating device; and (ii) location information of the POS device;

identifying, by the server, a network-enabled authorizing client device for the payment transaction based on the received payment information, the authorizing client device being associated with the user in a prior registration phase and being different from the payment facilitating device;

transmitting, by the server, the location information of the POS device to the authorizing client device;

requesting, by the server, the authorizing client device to compare the transmitted location information of the POS device to location information of the authorizing client device, the location information of the authorizing client device being determined by the authorizing client device and including at least one of GPS geo-coordinates, information relating to a transmitting cell tower, information relating to a wireless access point, and information relating to a LAN;

receiving, by the server, a result of the requested comparison; and when a transaction amount for the payment transaction exceeds a threshold transaction amount:
  (i) sending, by the server, a message to the authorizing client device for display to the user, the message including a request to verify the payment transaction; and
  (ii) granting, by the server, the request to proceed with the processing of the payment transaction when:
    (a) the result of the requested comparison indicates that a distance between the authorizing client device and the POS device does not exceed a threshold distance and
    (b) a verifying response to the request to verify the payment transaction is received by the server from the authorizing client device.

* * * * *